US012720437B2

(12) United States Patent
Xi et al.

(10) Patent No.: US 12,720,437 B2
(45) Date of Patent: Aug. 25, 2026

(54) METHOD AND APPARATUS FOR OPTIMIZING POWER CONSUMPTION OF 5G TERMINAL DURING CONCURRENCY OF SERVICES, DEVICE, AND MEDIUM

(71) Applicant: Spreadtrum Communications (Shanghai) Co., Ltd., Shanghai (CN)

(72) Inventors: Jun Xi, Shanghai (CN); Xiaoqing Xue, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 752 days.

(21) Appl. No.: 18/027,778

(22) PCT Filed: Sep. 10, 2021

(86) PCT No.: PCT/CN2021/117829
§ 371 (c)(1),
(2) Date: Mar. 22, 2023

(87) PCT Pub. No.: WO2022/062922
PCT Pub. Date: Mar. 31, 2022

(65) Prior Publication Data

US 2023/0362824 A1 Nov. 9, 2023

(30) Foreign Application Priority Data

Sep. 22, 2020 (CN) ......................... 202011000557.7

(51) Int. Cl.
*H04W 52/02* (2009.01)
*H04W 36/00* (2009.01)
*H04W 36/14* (2009.01)

(52) U.S. Cl.
CPC . *H04W 52/0261* (2013.01); *H04W 36/00837* (2018.08); *H04W 36/14* (2013.01)

(58) Field of Classification Search
CPC ....... H04W 52/0261; H04W 36/00837; H04W 36/14; H04W 36/165; H04W 36/28; Y02D 30/70
See application file for complete search history.

(56) References Cited

U.S. PATENT DOCUMENTS

2020/0024539 A1 1/2020 Wang et al.
2020/0128494 A1* 4/2020 Lu ....................... H04W 52/367
(Continued)

FOREIGN PATENT DOCUMENTS

CN 110300461 A 10/2019
CN 110446235 A 11/2019
(Continued)

OTHER PUBLICATIONS

Electronic English Translation for CN111225424(A); Authors: Li Liu and Shao JunJun; Title: Service data transmission method and device, storage medium and terminal equipment, Jun. 2, 2020 (Year: 2020).*

(Continued)

*Primary Examiner* — Marisol Figueroa
(74) *Attorney, Agent, or Firm* — The Webb Law Firm

(57) ABSTRACT

Provided are a method for optimizing power consumption of a 5G terminal during concurrency of services, an electronic device and a storage medium, where the 5G terminal is located in an EN-DC network. The method includes: detecting whether the 5G terminal is in a state where a voice service and a data service are concurrent; determining whether the 5G terminal meets a preset power consumption optimization condition, in response to detecting that the 5G terminal is in the state where the voice and data services are concurrent; and switching the data service to a 4G LTE network, in response to determining that the 5G terminal meets the preset power consumption optimization condition.

12 Claims, 4 Drawing Sheets

(56) References Cited

U.S. PATENT DOCUMENTS

2020/0351792 A1* 11/2020 Ghelichi ........... H04W 52/0277
2021/0136702 A1* 5/2021 Wang .................... H04W 52/30

FOREIGN PATENT DOCUMENTS

CN 110505675 A 11/2019
CN 110557777 A 12/2019
CN 110831096 A 2/2020
CN 111225424 A 6/2020
CN 111405664 A 7/2020
CN 111465043 A 7/2020
CN 111669805 A 9/2020
CN 112188576 A 1/2021
CN 112399516 A 2/2021
WO 2020043059 A1 3/2020
WO WO-2020045952 A1 * 3/2020 ............ H04W 76/16

OTHER PUBLICATIONS

Chinese Office Action; Chinese Application No. 2020110005577, filed Sep. 22, 2020.
International Serach Report for Internatinoal application No. PCT /CN2021/117829, Date of Completion Nov. 4, 2021, ISA/CN.
Chinese Notice of Allowance; Chinese Application No. 2020110005577, filed Sep. 22, 2020.

* cited by examiner

METHOD AND APPARATUS FOR OPTIMIZING POWER CONSUMPTION OF 5G TERMINAL DURING CONCURRENCY OF SERVICES, DEVICE, AND MEDIUM

CROSS-REFERENCE TO RELATED APPLICATIONS

This application is a National Stage of International Application No. PCT/CN2021/117829, filed on Sep. 10, 2021. This International application claims priority to Chinese patent application No. 202011000557.7, filed with China National Intellectual Property Administration on Sep. 22, 2020, and entitled. The contents of these applications are hereby incorporated by reference in their entireties.

TECHNICAL FIELD

The present disclosure relates to the field of communication technologies, and in particular to a method and apparatus for optimizing power consumption of a 5G terminal during concurrency of services, a device and a medium.

BACKGROUND

Since 2019, operators around the world have begun to gradually deploy 5G networks. Due to factors such as industrial chain development and considerations on investment cost, in the initial stage, operators often use NSA (Non-Standalone) network architecture for rapid construction of 5G networks. The NSA network architecture is dominated by an EN-DC networking scheme promoted by 3GPP in the R15 NR NSA standard.

EN-DC refers to dual connectivity of a 4G radio access network and 5G NR. "DC" represents Dual Connectivity, that is, dual connection. "E" represents E-UTRA, that is, the 4G radio access network. "N" represents NR, that is, the 5G new radio. The EN-DC currently takes the 4G network as a backbone for signaling plane bearer, while 5G carrier under the NSA architecture is only for user plane bearer, and its control signaling is still transmitted through the 4G network.

The biggest advantage of the EN-DC networking scheme lies in its low initial investment. It utilizes the currently available 4G LTE (Long Term Evolution) radio access network and core network to achieve the rapid deployment of the 5G network, and it thus has become a preferred option for most operators to deploy the 5G network. In the EN-DC networking scheme, voice services are carried on the 4G LTE network using VoLTE technology, and data services are carried on the 5G NR network.

Under the EN-DC networking scheme, a terminal maintains connection with the LTE and NR networks at the same time. Since the 5G NR network provides a larger bandwidth, a higher data transmission rate and a lower data transmission delay, it poses a particularly great challenge to the terminal's power consumption, battery life and heating, especially for handheld 5G terminals, such as mobile phones, PADs and other products.

Table 1 shows test results of power consumption of CMCC (China Mobile) terminals tested when entering warehouse, where CMCC is the largest operator in China. It shows the power consumption requirements of the terminals under 4G LTE and 5G NR for different data services. Although different terminals would vary slightly in term of their performance, this indicator represents the general power consumption level of the terminals. As can be seen from Table 1, although 5G NR can provide high-speed data service experience, its power consumption is significantly higher than that of 4G LTE. Depending on different data services, this excess part of power consumption is between 200 mA and 320 mA, accounting for 71% to 107%.

TABLE 1

Test results of power consumption of CMCC terminals tested when entering warehouse, and warehousing standards

| Power consumption tests for CMCC terminals when entering warehouse | | Definition of rate | Power consumption requirements (current) | 5G power consumption/ 4G power consumption |
|---|---|---|---|---|
| High speed downloading | 4G LTE | >80 Mbps | <300 mA | 207% |
| | 5G NR | >800 Mbps | <620 mA | |
| High speed uploading | 4G LTE | >8 Mbps | <280 mA | 171% |
| | 5G NR | >90 Mbps | <480 mA | |
| Low speed downloading | 4G LTE | >8.5 Mbps | <250 mA | 200% |
| | 5G NR | >100 Mbps | <500 mA | |
| Low speed uploading | 4G LTE | >1.6 Mbps | <250 mA | 180% |
| | 5G NR | >10 Mbps | <450 mA | |

Therefore, the present disclosure is in an urgent need to provide an optimization scheme that can reduce the power consumption of a 5G terminal when the terminal is located in the EN-DC network and under a scenario where voice and data services are concurrent.

SUMMARY

In view of the defects in the related art mentioned above, the present disclosure aims to provide a method for optimizing power consumption of a 5G terminal during concurrency of services, a device and a medium.

Embodiments of the present disclosure provide a method for optimizing power consumption of a 5G terminal during concurrency of services, where the 5G terminal is located in an EN-DC network, and the method includes:

- detecting whether the 5G terminal is in a state where a voice service and a data service are concurrent;
- determining whether the 5G terminal meets a preset power consumption optimization condition, in response to detecting that the 5G terminal is in the state where the voice service and the data service are concurrent; and switching the data service to a 4G LTE network, in response to determining that the 5G terminal meets the preset power consumption optimization condition.

The embodiments of the present disclosure also provide an electronic device, which includes a memory, a processor, and a computer program stored on the memory and capable of running on the processor. When the processor executes the computer program, the aforementioned method for optimizing power consumption of a 5G terminal during concurrency of services is implemented.

The embodiments of the present disclosure also provide a non-transitory computer-readable storage medium having a computer program stored thereon. The computer program, when being executed by a processor, causes the aforementioned method for optimizing power consumption of a 5G terminal during concurrency of services to be implemented.

BRIEF DESCRIPTION OF DRAWINGS

In order to more clearly illustrate the technical solutions in the embodiments of the present disclosure or the related art, the drawings that need to be used in the description of the embodiments or the related art are briefly introduced hereafter. Obviously, the drawings in the following description are some embodiments of the present disclosure; and for those of ordinary skill in the art, other drawings can also be obtained from these drawings without any creative effort.

DESCRIPTION OF EMBODIMENTS

Figure 1:
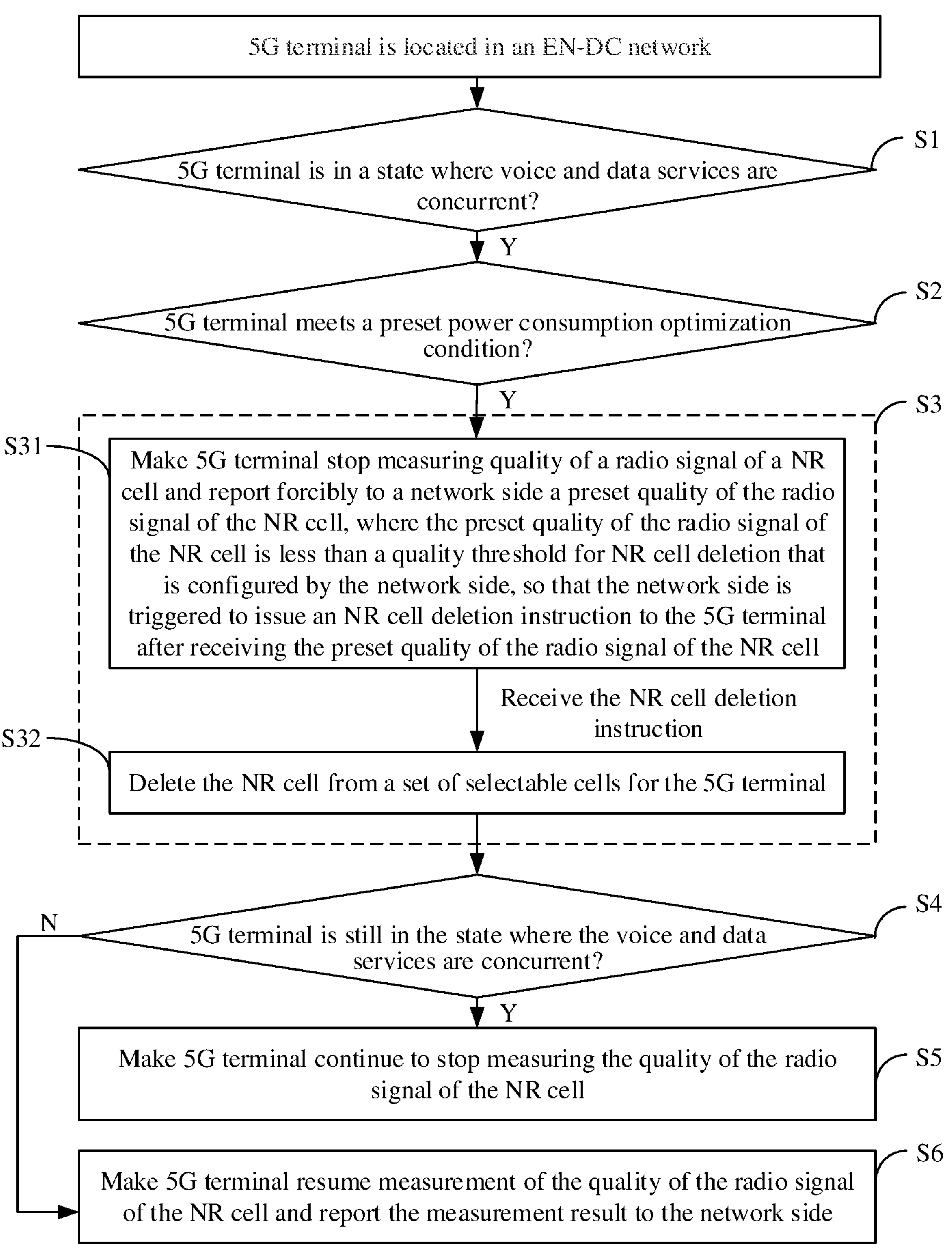
FIG. 1 is a flowchart of a method for optimizing power consumption of a 5G terminal under concurrency of services in Embodiment 1 of the present disclosure.

In order to make the object, technical solutions and advantages of the present disclosure clearer, the present disclosure will be further described in detail below in conjunction with the drawings and embodiments. It should be understood that the specific embodiments described here are only used to explain the present disclosure, and are not used to limit the present disclosure. Based on the embodiments in the present disclosure, all other embodiments, obtained by those of ordinary skill in the art without any creative efforts, fall within the scope of protection of the present disclosure.

The terms used in the present disclosure is only for the purpose of describing particular embodiments, and are not intended to limit the present disclosure. The singular forms "a", "the" and "this" used in the disclosure and the appended claims are intended to include the plural forms as well, unless the context clearly indicates other meaning otherwise. It should also be understood that the term "and/or" as used herein refers to and includes any or all possible combinations of one or more associated listed items.

In the related art, when a 5G terminal resides in the NSA EN-DC network, the network supports the process of adding and deleting an NR cell based on qualities of radio signals. Specifically, the network side configures quality thresholds for the radio signals of the NR cell, which are respectively named as a quality threshold for NR cell addition, NR Threshold1, and a quality threshold for NR cell deletion, NR Threshold2. During normal operations, the network side periodically issues to the terminal a measurement instruction to measure the quality of the radio signal of the NR cell, and the terminal measures, according to the measurement instruction, the quality of the radio signal of a detected NR cell and reports it to the network side. When the 5G terminal measures that the quality of the radio signal of the NR cell is greater than NR Threshold1, the following NR cell addition process would be triggered: after receiving the quality of the radio signal of the NR cell, the network side issues a corresponding NR cell addition instruction to the 5G terminal; and after receiving the NR cell addition instruction, the 5G terminal adds the corresponding NR cell to a set of selectable cells for the 5G terminal, where the set of selectable cells here refers to a collection of all cells which the 5G terminal can choose to reside in. When the 5G terminal measures that the quality of the radio signal of a certain NR cell is less than NR Threshold2, the following NR cell deletion process would be triggered: after receiving the quality of the radio signal of the NR cell, the network side issues a corresponding NR cell deletion instruction to the 5G terminal; and after receiving the NR cell deletion instruction, the 5G terminal deletes the corresponding NR cell from the set of selectable cells for the 5G terminal. In the present disclosure, the quality of the radio signal may be either reference signal received power (RSRP) or reference signal received quality (RSRQ).

As can be seen, when the radio network environment in which the terminal is located meets that the quality of the radio signal of the NR cell is greater than NR Threshold1, the NR cell addition process is triggered, to achieve the dual connectivity of the 5G terminal with an LTE cell and an NR cell. At this time, if the terminal user initiates a voice service and a data service concurrently, according to the currently available technical scheme of EN-DC dual connectivity, the voice service would be carried on VoLTE and the data service would be carried on NR, resulting in high power consumption.

Embodiment 1

The inventors found that, when the user is in a scenario where the voice service and the data service are concurrent, the user mainly focuses on the voice service, and has a significantly decreased attention to the data service. At this time, whether the data service is carried on the 5G NR network or not, and the quality of the data service such as the rate and delay, are not important to the user. In this scenario, as long as the data service is switched from being originally carried on the 5G NR to being carried on the 4G LTE, the power consumption of the 5G terminal can be greatly reduced, that is because the power consumption of 5G NR is significantly higher than that of 4G LTE.

On this basis, for the problem of high power consumption of the 5G terminal during concurrency of the voice and data services in the EN-DC network, this embodiment provides a method for optimizing the power consumption of a 5G terminal during concurrency of services. The method provided in all the embodiments of the disclosure is implemented by an apparatus for optimizing power consumption of a 5G terminal during concurrency of services, which apparatus is implemented in the 5G terminal and is described in detail below. As shown in FIG. 1, the method includes operations as follows.

S1, detect whether the 5G terminal is in a state where a voice service and a data service are concurrent. If yes, the method proceeds to S2; otherwise, this means that the optimization for power consumption is unnecessary, and the flow ends.

S2, determine whether the 5G terminal meets a preset power consumption optimization condition. If yes, this means that the optimization for power consumption is needed, and the method proceeds to S3; and if no, this means that the optimization for power consumption is unnecessary, and the flow ends.

In this embodiment, the power consumption optimization condition includes that a time duration during which the voice service and the data service are concurrent is greater than a first time threshold T1. On this basis, the specific implementation process of S2 is as follows: determining whether a time duration during which the voice service and the data service are concurrent is greater than a first time threshold T1; if yes, determining that the 5G terminal meets the preset power consumption optimization condition; and if no, determining that the 5G terminal does not meet the preset power consumption optimization condition.

S3, switch the data service to a 4G LTE network, to achieve optimization of the power consumption of the 5G terminal.

In this embodiment, the data service is switched to the 4G LTE network through the following operations.

S31, make the 5G terminal stop measuring a quality of a radio signal of an NR cell, and report forcibly (intentionally or deliberately) to a network side a preset quality of the radio signal of the NR cell, where the preset quality of the radio signal of the NR cell is less than a quality threshold for NR cell deletion that is pre-configured by the network side, so that the network side is triggered to issue an NR cell deletion instruction to the 5G terminal after receiving the preset quality of the radio signal of the NR cell.

As mentioned above, the network side configures quality thresholds for the radio signals of the NR cell, which are respectively named as a quality threshold for NR cell addition, NR Threshold1, and a quality threshold for NR cell deletion, NR Threshold2. When the quality of the radio signal of the NR cell reported by the 5G terminal is greater than NR Threshold1, the network side issues a corresponding NR cell addition instruction to the 5G terminal. When the quality of the radio signal of the NR cell reported by the 5G terminal is less than NR Threshold2, the network side issues a corresponding NR cell deletion instruction to the 5G terminal.

On this basis, as long as the preset quality, NR Measurement, of the radio signal of the NR cell, which is reported forcibly to the network side, is set to be less than NR Threshold2, such as NR Measurement=NR Threshold2-Delta, the network side can be triggered to issue an NR cell deletion instruction to the 5G terminal after receiving the preset quality of the radio signal of the NR cell. The NR Measurement here is unrelated to the actual measurement value, but is related to NR Threshold2 configured by the network side and the Delta value configured by the terminal.

S32, after reception of the NR cell deletion instruction issued by the network side, delete the NR cell from the set of selectable cells for the 5G terminal, so that the 5G terminal can no longer make dual connection with the LTE cell and the NR cell, but can only make single connection with 4G LTE. Compared with the EN-DC dual-connectivity state, in the LTE single-connection state, the voice service is carried on VoLTE and the data service is migrated from being originally carried on the NR to being carried on the LTE; accordingly, an effect of reducing the power consumption of the 5G terminal can be achieved, that is because the power consumption of 4G LTE is significantly lower than that of 5G NR.

S4, continue to detect whether the 5G terminal is still in the state where the voice service and the data service are concurrent. If yes, the method proceeds to S5; and if no, the method proceeds to S6.

S5, when the 5G terminal is still in the state where the voice service and the data service are concurrent, control the data service to keep being carried on the 4G LTE.

It is known that the network side would periodically re-issue the measurement instruction for the quality of the radio signal of the 5G NR cell. In this embodiment, when the 5G terminal is still in the state where the voice service and the data service are concurrent, after reception of the measurement instruction for the quality of the radio signal issued by the network side, the 5G terminal is controlled to continue to stop measuring the quality of the radio signal of the NR cell, thereby ensuring that the terminal continues to be in the 4G LTE single connection state, so as to reduce the power consumption.

S6, when the 5G terminal is no longer in the state where the voice service and the data service are concurrent, make the 5G terminal resume normal measurement of the quality of the radio signal of the NR cell and report a measurement result to the network side.

Specifically, when a call of the 5G terminal is hung up and thus the 5G terminal is no longer in the state where the voice service and the data service are concurrent, after receiving the measurement instruction for the quality of the radio signal issued by the network side, the 5G terminal is controlled to resume normal measurement of the quality of the radio signal of the NR cell, and report the measured actual quality of the radio signal of the NR cell to the network side. When the measured quality of the radio signal of the NR cell is greater than NR Threshold1, the above-mentioned NR cell addition process is triggered, to make the terminal switched to the EN-DC dual-connectivity state again; thus the data service is restored to be carried on the NR, to ensure the user's data service experience under the 5G network.

Through the optimization scheme of this embodiment, it is expected that the reduced power consumption can be between 200 mA and 320 mA, and the proportion of power consumption optimization is between 32% and 42%, as shown in Table 2.

TABLE 2

Expected results of power consumption optimization in this embodiment

| Service scenario | | Power consumption | Saved power consumption | Proportion of power consumption optimization |
|---|---|---|---|---|
| VoLTE + High speed downloading | Before optimization (VoLTE + NR) | 140 mA + 620 mA | 320 mA | 42% |
| | After optimization (VoLTE + LTE) | 140 mA + 300 mA | | |
| VoLTE + High speed uploading | Before optimization (VoLTE + NR) | 140 mA + 480 mA | 200 mA | 32% |
| | After optimization (VoLTE + LTE) | 140 mA + 280 mA | | |
| VoLTE + Low speed downloading | Before optimization (VoLTE + NR) | 140 mA + 500 mA | 250 mA | 39% |
| | After optimization (VoLTE + LTE) | 140 mA + 250 mA | | |

TABLE 2-continued

Expected results of power consumption optimization in this embodiment

| Service scenario | | Power consumption | Saved power consumption | Proportion of power consumption optimization |
|---|---|---|---|---|
| VoLTE + Low speed uploading | Before optimization (VoLTE + NR) | 140 mA + 450 mA | 200 mA | 34% |
| | After optimization (VoLTE + LTE) | 140 mA + 250 mA | | |

For the data in Table 2, it is illustrated as follows: the power consumption of VoLTE voice is 140 mA, with reference to the power consumption requirement for CMCC terminals when entering warehouse; and the proportion of power consumption optimization=the saved power consumption/the total power consumption before optimization.

Embodiment 2

Figure 2:
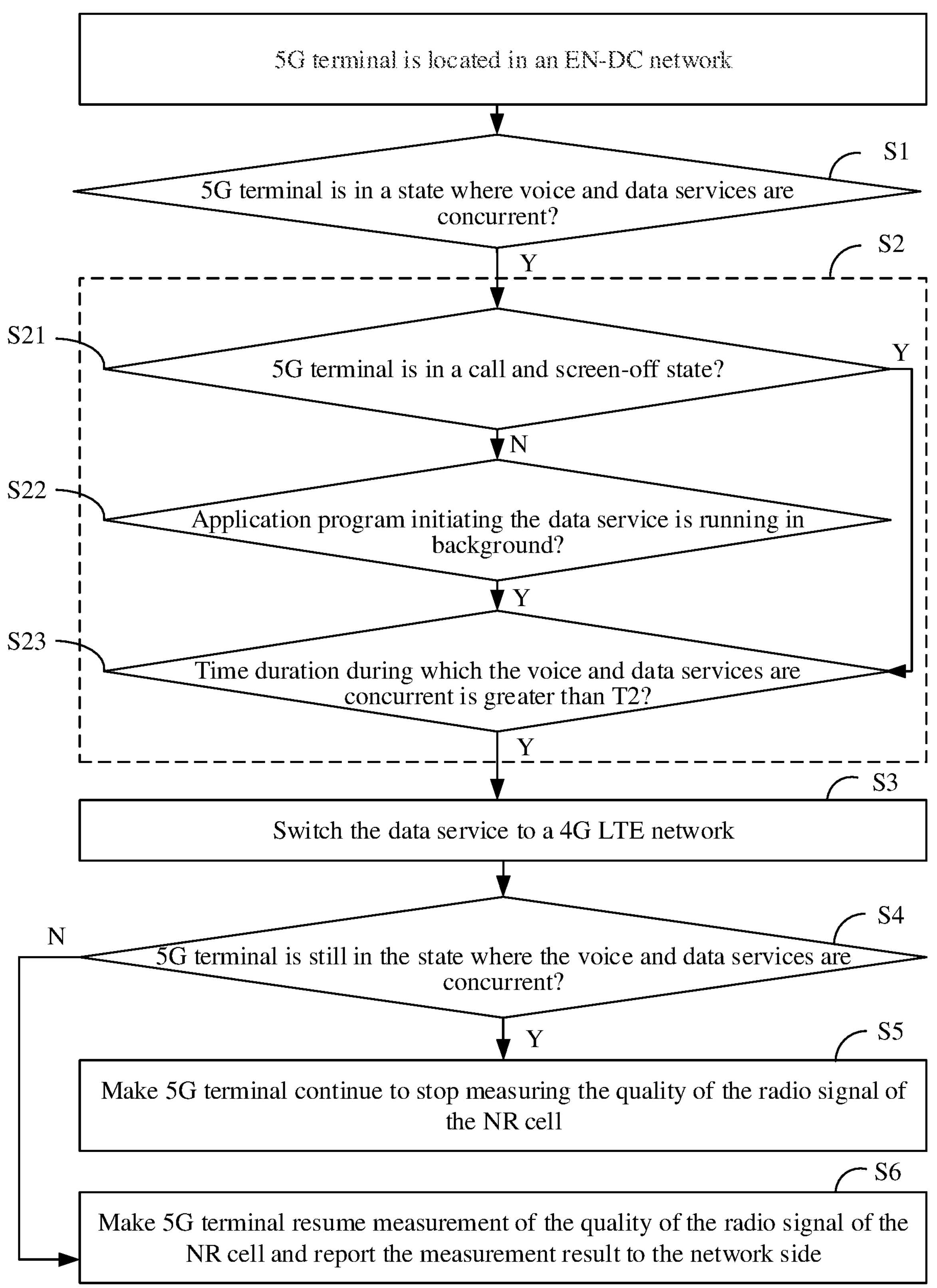
FIG. 2 is a flowchart of a method for optimizing power consumption of a 5G terminal under concurrency of services in Embodiment 2 of the present disclosure.

As shown in FIG. 2, the difference between this embodiment and Embodiment 1 lies in that the power consumption optimization condition set in S2 is different. In this embodiment, the power consumption optimization condition includes that: the 5G terminal is in a call and screen-off state, or the 5G terminal is in a call and screen-on state but an application program initiating the data service is running in the background; meanwhile, the time duration during which the voice service and the data service are concurrent is greater than a second time threshold. On this basis, the specific determining process of the aforementioned S2 is as follows.

S21, first determine whether the 5G terminal is in a call and screen-off state or a call and screen-on state. If the 5G terminal is in the call and screen-on state, this means that the user may still be concerned about the data service, and the method proceeds to S22 to make further determination. If the 5G terminal is in the call and screen-off state, this means that the user is not concerned about the data service, and the method proceeds to S23. In this embodiment, the call and screen-on state refers to a state that the display screen of the 5G terminal is turned on while the 5G terminal is in a call, and the call and screen-off state refers to a state that the display screen of the 5G terminal is turned off while the 5G terminal is in a call.

S22, when the 5G terminal is in the call and screen-on state, continue to determine whether the application program initiating the data service is running in the background. If yes, this means that the user is not concerned about the data service, and the method proceeds to S23. If no, this means that the user may still be concerned about the data service, and it does not initiate the optimization for power consumption and the flow ends.

S23, continue to determine whether the time duration during which the voice service and the data service are concurrent is greater than a second time threshold T2. If yes, it is determined that the 5G terminal meets the preset power consumption optimization condition, and the power consumption optimization scheme of S3 is started; otherwise, it is determined that the 5G terminal does not meet the preset power consumption optimization condition and the optimization for power consumption is unnecessary, the power consumption optimization scheme is not started.

In this embodiment, it is determined, in combination with different scenarios, whether the terminal needs to start the power consumption optimization scheme, through which the user requirements are considered more comprehensively and the user experience is improved.

Embodiment 3

Figure 3:
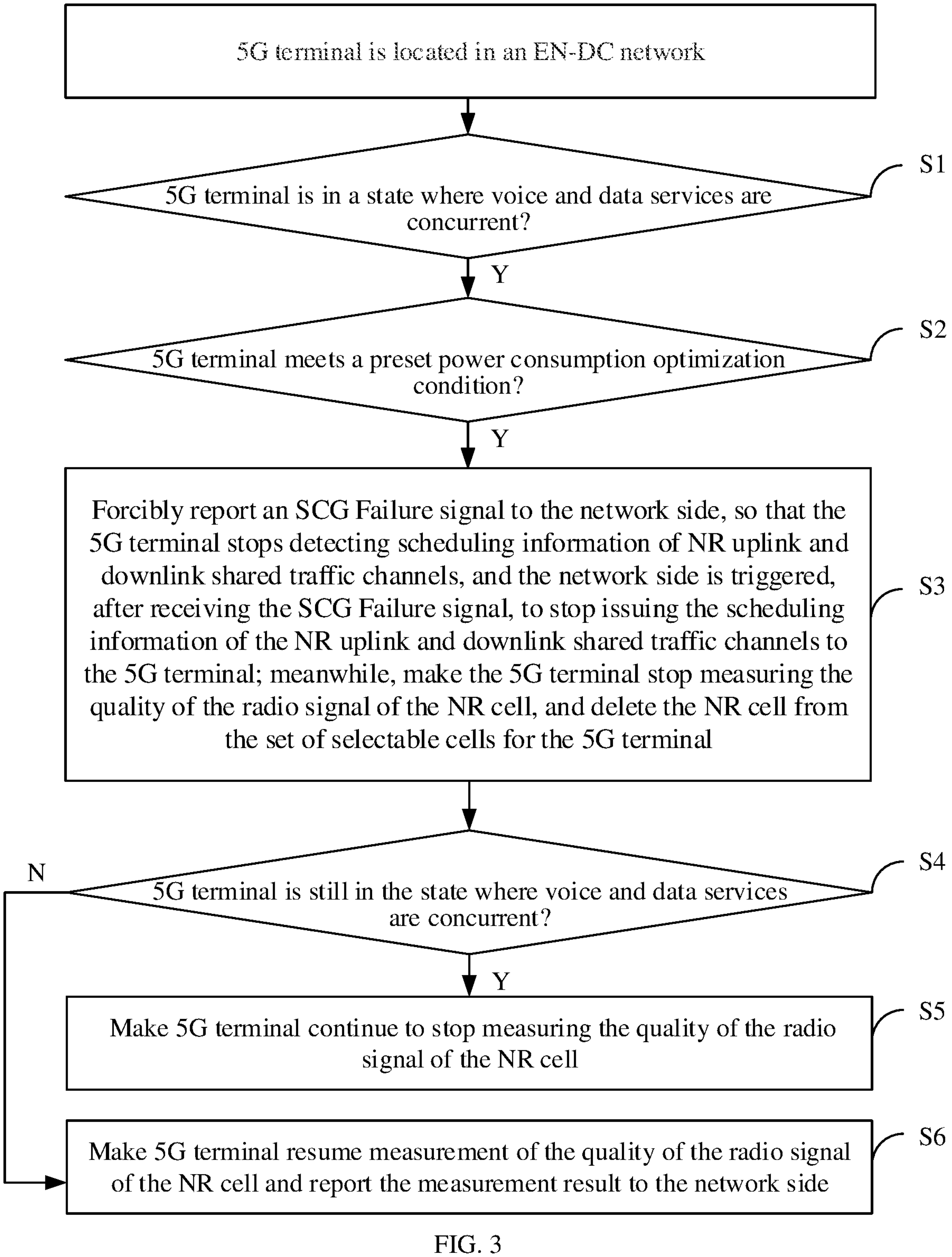
FIG. 3 is a flowchart of a method for optimizing power consumption of a 5G terminal under concurrency of services in Embodiment 3 of the present disclosure.

As shown in FIG. 3, the difference between this embodiment and Embodiment 1 lies in that the power consumption optimization scheme adopted in S3 is different.

In this embodiment, the data service is switched to the 4G LTE network through operations of: forcibly reporting an SCG Failure (Secondary Cell group radio link failure information) signal to the network side, so that the 5G terminal stops detecting scheduling information of NR uplink and downlink shared traffic channels, and the network side is triggered, after receiving the SCG Failure signal, to stop issuing the scheduling information of the NR uplink and downlink shared traffic channels to the 5G terminal; meanwhile, making the 5G terminal stop measuring the quality of the radio signal of the NR cell, and delete the NR cell from the set of selectable cells for the 5G terminal.

It is known that, in the EN-DC networking scheme, the 4G base station serves as a Master Node (MN for short), and the 5G base station serves as a Secondary Node (SN for short); and this scheme causes the data service of the terminal to be carried by establishing a separate bearer of a Secondary Cell Group (SCG for short).

When the network side detects the radio link failure information (SCG Failure) of the NR cell, the network side would stop issuing the scheduling information of the NR uplink and downlink shared traffic channels to the 5G terminal, and the 5G terminal can no longer make dual connection with the LTE cell and the NR cell within a certain valid period, but can only make single connection with 4G LTE. Compared with the EN-DC dual-connectivity state, in the LTE single-connection state, the voice service is carried on VoLTE and the data service is migrated from being originally carried on the NR to being carried on the LTE; accordingly, an effect of reducing the power consumption of the 5G terminal can be achieved, that is because the power consumption of 4G LTE is significantly lower than that of 5G NR.

In addition, in this embodiment, the 5G terminal is prevented from returning to (accessing) the 5G network during a period in which the above-mentioned valid period has expired but the voice service and the data service are still concurrent, by means of making the 5G terminal stop measuring the quality of the radio signal of the NR cell and delete the NR cell from the set of selectable cells for the 5G terminal.

Thereafter, as described in S4 of Embodiment 1, it continues to detect whether the 5G terminal is still in the state where the voice service and the data service are concurrent;

if yes, the method proceeds to S5 as mentioned above, and if no, the method proceeds to S6 as mentioned above.

This embodiment provides an alternative scheme for optimizing the power consumption, which can also achieve the purpose of reducing the power consumption of the terminal.

Embodiment 4

Figure 4:
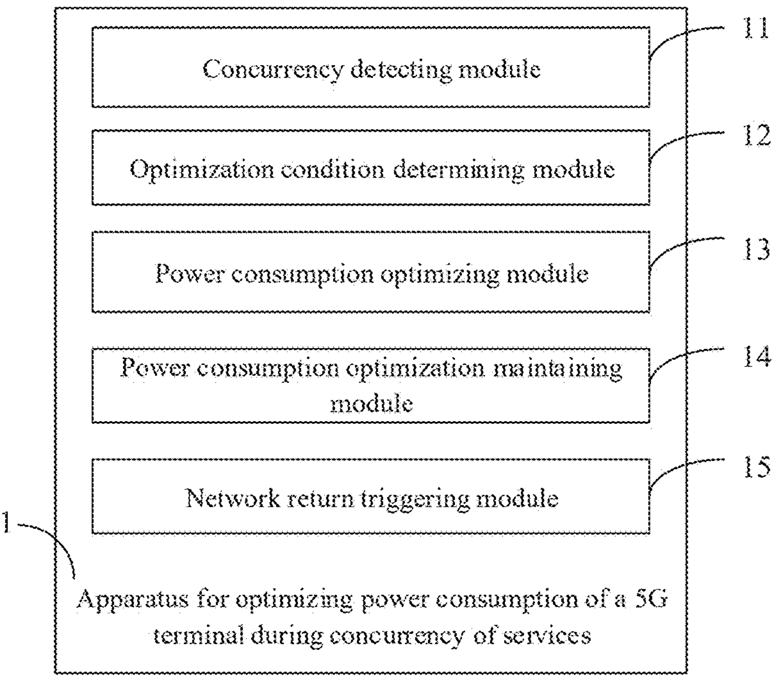
FIG. 4 is a structural block diagram of an apparatus for optimizing power consumption of a 5G terminal under concurrency of services in Embodiment 4 of the present disclosure.

For the problem of high power consumption of the 5G terminal during concurrency of the voice and data services in the EN-DC network, this embodiment provides an apparatus for optimizing power consumption of a 5G terminal during concurrency of services. As shown in FIG. 4, the apparatus 1 includes a concurrency detecting module 11, an optimization condition determining module 12, a power consumption optimizing module 13, a power consumption optimization maintaining module 14, and a network return triggering module 15. Each module is described in detail below.

The concurrency detecting module 11 is configured to detect whether the 5G terminal is in a state where a voice service and a data service are concurrent, and if yes, invoke the optimization condition determining module 12, otherwise, this means that the optimization for power consumption is unnecessary.

The optimization condition determining module 12 is configured to determine whether the 5G terminal meets a preset power consumption optimization condition; if yes, invoke the power consumption optimizing module 13, as this means that the optimization for power consumption is needed; and if no, this means that the optimization for power consumption is unnecessary.

In this embodiment, the power consumption optimization condition includes that a time duration during which the voice service and the data service are concurrent is greater than a first time threshold T1. On this basis, the specific determining process of this module is as follows: first determining whether the time duration during which the voice service and the data service are concurrent is greater than the first time threshold T1; if yes, determining that the 5G terminal meets the preset power consumption optimization condition; and if no, determining that the 5G terminal does not meet the preset power consumption optimization condition.

The power consumption optimizing module 13 is configured to switch the data service to a 4G LTE network, to achieve optimization of the power consumption of the 5G terminal.

In this embodiment, the power consumption optimizing module 13 switches the data service to the 4G LTE network through the following operations.

First, it makes the 5G terminal stop measuring a quality of a radio signal of an NR cell, and report forcibly to the network side a preset quality of the radio signal of the NR cell, where the preset quality of the radio signal of the NR cell is less than a quality threshold for NR cell deletion that is pre-configured by the network side, so that the network side is triggered to issue an NR cell deletion instruction to the 5G terminal after receiving the preset quality of the radio signal of the NR cell.

As mentioned above, the network side configures quality thresholds for the radio signals of the NR cell, which are respectively named as a quality threshold for NR cell addition, NR Threshold1, and a quality threshold for NR cell deletion, NR Threshold2. When the quality of the radio signal of the NR cell reported by the 5G terminal is greater than NR Threshold1, the network side issues a corresponding NR cell addition instruction to the 5G terminal. When the quality of the radio signal of the NR cell reported by the 5G terminal is less than NR Threshold2, the network side issues a corresponding NR cell deletion instruction to the 5G terminal.

On this basis, as long as the preset quality, NR Measurement, of the radio signal of the NR cell, which is reported forcibly to the network side, is set to be less than NR Threshold2, such as NR Measurement=NR Threshold2-Delta, the network side can be triggered to issue an NR cell deletion instruction to the 5G terminal after receiving the preset quality of the radio signal of the NR cell. The NR Measurement here is unrelated to the actual measurement value, but is related to NR Threshold2 configured by the network side and the Delta value configured by the terminal.

Then, after reception of the NR cell deletion instruction issued by the network side, the NR cell is deleted from the set of selectable cells for the 5G terminal, so that the 5G terminal can no longer make dual connection with the LTE cell and the NR cell, but can only make single connection with 4G LTE. Compared with the EN-DC dual-connectivity state, in the LTE single-connection state, the voice service is carried on VoLTE and the data service is migrated from being originally carried on the NR to being carried on the LTE; accordingly, an effect of reducing the power consumption of the 5G terminal can be achieved, that is because the power consumption of 4G LTE is significantly lower than that of 5G NR.

After switching the data service to the 4G LTE network, the power consumption optimizing module 13 invokes the concurrency detecting module 11 to continue to detect whether the 5G terminal is still in the state where the voice service and the data service are concurrent. If yes, it invokes the power consumption optimization maintaining module 14, and if no, it invokes the network return triggering module 15.

The power consumption optimization maintaining module 14 is configured to control the data service to keep being carried on the 4G LTE network, specifically, to make the 5G terminal continue to stop measuring the quality of the radio signal of the NR cell. It is known that the network side would periodically re-issue the measurement instruction for the quality of the radio signal of the 5G NR cell. In this embodiment, when the 5G terminal is still in the state where the voice service and data service are concurrent, after reception of the measurement instruction for the quality of the radio signal issued by the network side, the power consumption optimization maintaining module 14 controls the 5G terminal to continue to stop measuring the quality of the radio signal of the NR cell, thereby ensuring that the terminal continues to be in the 4G LTE single connection state, so as to reduce the power consumption.

The network return triggering module 15 is configured to, after reception of the measurement instruction for the quality of the radio signal issued by the network side, control the 5G terminal to resume normal measurement of the quality of the radio signal of the NR cell and report the measured actual quality of the radio signal of the NR cell to the network side. When the measured quality of the radio signal of the NR cell is greater than NR Threshold 1, the above-mentioned NR cell addition process is triggered, to make the terminal switched to the EN-DC dual-connectivity state again; thus the data service is restored to be carried on the NR, to ensure the user's data service experience under the 5G network.

Through the optimization scheme of this embodiment, it is expected that the reduced power consumption can be between 200 mA and 320 mA, and the proportion of power consumption optimization is between 32% and 42%, as shown in Table 2 mentioned above.

Embodiment 5

The difference between this embodiment and Embodiment 4 lies in that the power consumption optimization condition set in the optimization condition determining module 12 is different. In this embodiment, the power consumption optimization condition includes that: the 5G terminal is in a call and screen-off state, or the 5G terminal is in a call and screen-on state but an application program initiating the data service is running in the background; meanwhile, the time duration during which the voice service and the data service are concurrent is greater than a second time threshold. On this basis, regarding the specific determining process of the optimization condition determining module 12, reference is made to S21 to S23 in Embodiment 2.

In this embodiment, it is determined, in combination with different scenarios, whether the terminal needs to start the power consumption optimization scheme, through which the user requirements are considered more comprehensively and the user experience is improved.

Embodiment 6

The difference between this embodiment and Embodiment 4 only lies in that the power consumption optimization scheme adopted by the power consumption optimizing module 13 is different.

In this embodiment, the power consumption optimizing module 13 switches the data service to the 4G LTE network through the following processes of: forcibly reporting an SCG Failure signal to a network side, so that the 5G terminal stops detecting scheduling information of NR uplink and downlink shared traffic channels, and the network side is triggered, after receiving the SCG Failure signal, to stop issuing the scheduling information of the NR uplink and downlink shared traffic channels to the 5G terminal; meanwhile, making the 5G terminal stop measuring the quality of the radio signal of the NR cell, and delete the NR cell from the set of selectable cells for the 5G terminal.

It is known that, in the EN-DC networking scheme, the 4G base station serves as a Master Node (MN for short), and the 5G base station serves as a Secondary Node (SN for short); and this scheme causes the data service of the terminal to be carried by establishing a separate bearer of a Secondary Cell Group (SCG for short).

When the network side detects the radio link failure information (SCG Failure) of the NR cell, the network side would stop issuing the scheduling information of the NR uplink and downlink shared traffic channels to the 5G terminal, and the 5G terminal can no longer make dual connection with the LTE cell and the NR cell within a certain valid period, but can only make single connection with 4G LTE. Compared with the EN-DC dual-connectivity state, in the LTE single-connection state, the voice service is carried on VoLTE and the data service is migrated from being originally carried on the NR to being carried on the LTE; accordingly, an effect of reducing the power consumption of the 5G terminal can be achieved, that is because the power consumption of 4G LTE is significantly lower than that of 5G NR.

In addition, the 5G terminal is prevented from returning to (accessing) the 5G network during a period in which the above-mentioned valid period has expired but the voice service and the data service are still concurrent, by means of making the 5G terminal stop measuring the quality of the radio signal of the NR cell and delete the NR cell from the set of selectable cells for the 5G terminal.

After the power consumption optimizing module 13 switches the data service to the 4G LTE network, if the concurrency detecting module 11 detects that the 5G terminal is still in the state where the voice service and data service are concurrent, it invokes the power consumption optimization maintaining module 14 to control the data service to keep being carried to the 4G LTE network. Specifically, the 5G terminal continues to stop measuring the quality of the radio signal of the NR cell. It is known that the network side would periodically re-issue the measurement instruction for the quality of the radio signal of the 5G NR cell. In this embodiment, when the 5G terminal is still in the state where the voice service and the data service are concurrent, after reception of the measurement instruction for the quality of the radio signal issued by the network side, the power consumption optimization maintaining module 14 controls the 5G terminal to continue to stop measuring the quality of the radio signal of the NR cell, thereby ensuring that the terminal continues to be in the 4G LTE single connection state, so as to reduce the power consumption.

When the concurrency detecting module 11 detects that a call of the 5G terminal is hung up and thus the 5G terminal is no longer in the state where the voice service and the data service are concurrent, it invokes the network return triggering module 15 to control, after reception of the measurement instruction for the quality of the radio signal issued by the network side, the 5G terminal to resume normal measurement of the quality of the radio signal of the NR cell, and report the measured actual quality of the radio signal of the NR cell to the network side. When the measured quality of the radio signal of the NR cell is greater than NR Threshold 1, the above-mentioned NR cell addition process is triggered, to make the terminal switched to the EN-DC dual-connectivity state again; thus the data service is restored to be carried on the NR, to ensure the user's data service experience under the 5G network.

This embodiment provides an alternative scheme for optimizing the power consumption, which can also achieve the purpose of reducing the power consumption of the terminal.

Embodiment 7

This embodiment provides an electronic device, which electronic device may be embodied in the form of a computing device (for example, it may be a server device), including a memory, a processor, and a computer program stored in the memory and capable of running on the processor. When the processor executes the computer program, the method for optimizing the power consumption of a 5G terminal during concurrency of services as provided in Embodiment 1, 2 or 3 may be implemented.

Figure 5:
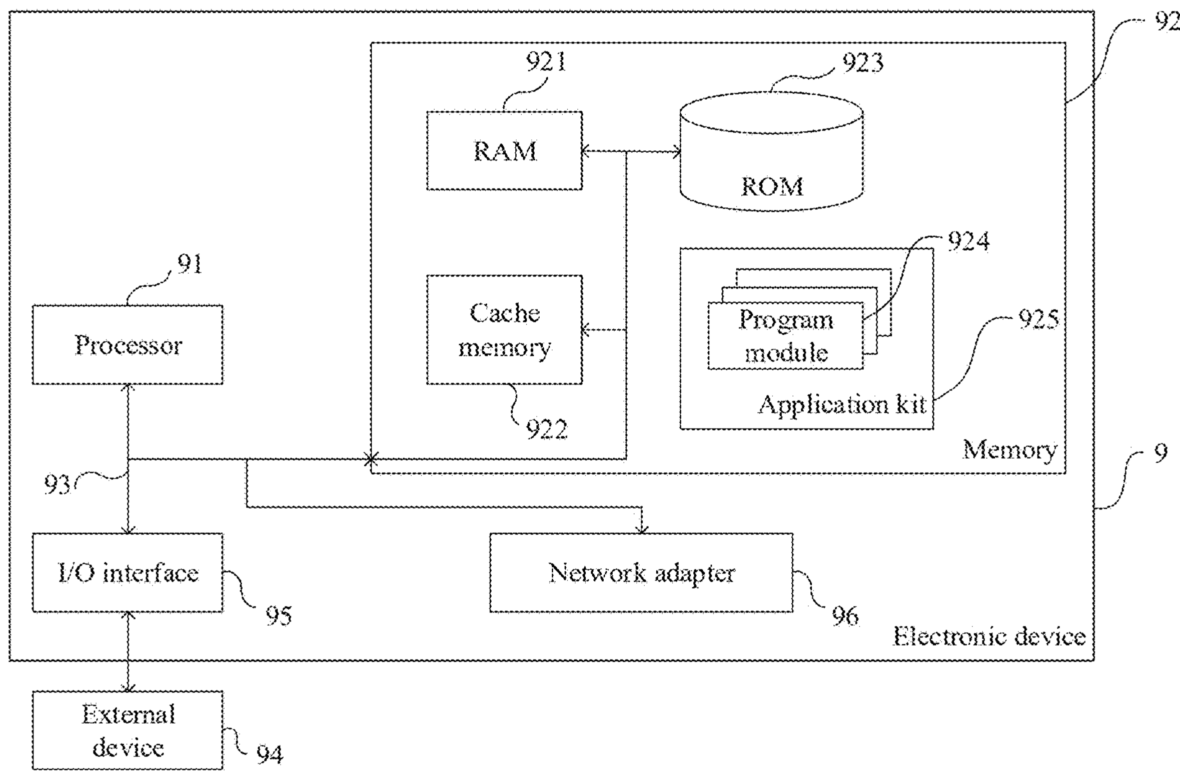
FIG. 5 is a hardware architecture diagram of an electronic device in Embodiment 7 of the present disclosure.

FIG. 5 shows a schematic diagram illustrating a hardware structure of the electronic device of this embodiment. As shown in FIG. 5, the electronic device 9 specifically includes:

at least one processor 91, at least one memory 92, and a bus 93 for connecting different system components (including the processor 91 and the memory 92).

The bus 93 includes a data bus, an address bus and a control bus.

The memory 92 includes a volatile memory, such as a random access memory (RAM) 921 and/or a cache memory 922, and may further include a read-only memory (ROM) 923.

The memory 92 also includes an application kit/utility kit 925 with a set of (at least one) program modules 924, such program modules 924 include, but are not limited to: an operating system, one or more application programs, other program modules and program data, where each or some combination of these examples may include the implementation of a network environment.

The processor 91 executes, by running the computer program stored in the memory 92, various functional applications and data processing, for example, the method for optimizing the power consumption of a 5G terminal during concurrency of services as provided in Embodiment 1, 2 or 3 of the present disclosure.

The electronic device 9 may further communicate with one or more external devices 94 (e.g., keyboard, and pointing device). This communication may be performed through an input/output (I/O) interface 95. Moreover, the electronic device 9 may also communicate with one or more networks (for example, a local area network (LAN), a wide area network (WAN) and/or a public network such as the Internet) through a network adapter 96. The network adapter 96 communicates with other modules of the electronic device 9 through the bus 93. It should be understood that, although not shown in the figure, other hardware and/or software modules may be used in conjunction with the electronic device 9, including but not limited to microcode, device driver, redundant processor, external disk drive array, RAID (Redundant Array of Independent Disks) system, tape drive, data backup storage system, and the like.

It should be noted that, although several units/modules or sub-units/modules of the electronic device are mentioned in the above detailed description, this division is only exemplary and not limiting. Actually, according to the embodiments of the present disclosure, the features and functions of two or more units/modules described above may be embodied in one unit/module. On the contrary, the features and functions of one unit/module described above may be further divided and embodied by multiple units/modules.

Embodiment 8

This embodiment provides a computer-readable storage medium having a computer program stored thereon, where the program, when being executed by a processor, causes the method for optimizing the power consumption of a 5G terminal during concurrency of services as provided in any of Embodiment 1, 2 and 3 to be implemented.

The computer-readable storage medium may specifically include but is not limited to: portable disk, hard disk, random access memory, read-only memory, erasable programmable read-only memory, optical storage device, magnetic storage device or any suitable combination of the above.

In a possible embodiment, the present disclosure may also be realized in the form of a program product, which includes program codes. When the program product is running on a terminal device, the program codes are used to cause the terminal device to implement the method for optimizing the power consumption of a 5G terminal during concurrency of services as provided in any of Embodiment 1, 2 and 3.

The program codes for executing the present disclosure may be written in any combination of one or more programming languages. The program codes may be completely executed on a user device, partially executed on the user device, executed as an independent software package, partially executed on the user device and partially executed on a remote device, or completely executed on the remote device.

Embodiments of the present disclosure aim to provide a method and apparatus for optimizing power consumption of a 5G terminal during concurrency of services, an electronic device and a medium, by which the 5G terminal, located in the EN-DC network and under a scenario where voice and data services are concurrent, can have reduced power consumption.

In an aspect, the embodiments of the present disclosure provide a method for optimizing power consumption of a 5G terminal during concurrency of services, where the 5G terminal is located in an EN-DC network, and the method includes:

detecting whether the 5G terminal is in a state where a voice service and a data service are concurrent;

determining whether the 5G terminal meets a preset power consumption optimization condition, in response to detecting that the 5G terminal is in the state where the voice service and the data service are concurrent; and switching the data service to a 4G LTE network, in response to determining that the 5G terminal meets the preset power consumption optimization condition.

In an embodiment of the present disclosure, the power consumption optimization condition includes:

a time duration during which the voice service and the data service are concurrent being greater than a first time threshold.

In an embodiment of the present disclosure, the power consumption optimization condition includes:

the 5G terminal being in a call and screen-off state, and a time duration during which the voice service and the data service are concurrent being greater than a second time threshold; or the 5G terminal being in a call and screen-on state but an application program that initiates the data service being running in background, and a time duration during which the voice service and the data service are concurrent being greater than a second time threshold.

In an embodiment of the present disclosure, the switching the data service to the 4G LTE network includes:

making the 5G terminal stop measuring a quality of a radio signal of an NR cell, and forcibly report a preset quality of the radio signal of the NR cell to a network side, where the preset quality of the radio signal of the NR cell is less than a quality threshold for NR cell deletion that is pre-configured by the network side, so that the network side is triggered to issue an NR cell deletion instruction to the 5G terminal after receiving the preset quality of the radio signal of the NR cell; and after reception of the NR cell deletion instruction, deleting the NR cell from a set of selectable cells for the 5G terminal, so that the data service is switched to the 4G LTE network.

In an embodiment of the present disclosure, after the switching the data service to the 4G LTE network, the method further includes:

continuing to detect whether the 5G terminal is still in the state where the voice service and the data service are concurrent;

making the 5G terminal continue to stop measuring the quality of the radio signal of the NR cell, in response to determining that the 5G terminal is still in the state where the voice service and the data service are concurrent; and making the 5G terminal resume measuring the quality of the radio signal of the NR cell and report a measurement result to the network side, in response to determining that the 5G terminal is no longer in the state where the voice service and the data service are concurrent.

In an embodiment of the present disclosure, the switching the data service to the 4G LTE network includes:

forcibly reporting an SCG Failure signal to a network side, so that the 5G terminal stops detecting scheduling information of NR uplink and downlink shared traffic channels, and the network side is triggered, after receiving the SCG Failure signal, to stop issuing the scheduling information of the NR uplink and downlink shared traffic channels to the 5G terminal; meanwhile, making the 5G terminal stop measuring a quality of a radio signal of an NR cell, and delete the NR cell from a set of selectable cells for the 5G terminal.

In another aspect, the embodiments of the present disclosure also provide an apparatus for optimizing power consumption of a 5G terminal during concurrency of services, where the 5G terminal is located in an EN-DC network, and the apparatus includes:

a concurrency detecting module, configured to detect whether the 5G terminal is in a state where a voice service and a data service are concurrent;

an optimization condition determining module, configured to determine whether the 5G terminal meets a preset power consumption optimization condition, when the 5G terminal is in the state where voice service and data service are concurrent; and a power consumption optimizing module, configured to switch the data service to a 4G LTE network, when the 5G terminal meets the preset power consumption optimization condition.

In an embodiment of the present disclosure, the power consumption optimization condition includes:

a time duration during which the voice service and the data service are concurrent being greater than a first time threshold.

In an embodiment of the present disclosure, the power consumption optimization condition includes:

the 5G terminal being in a call and screen-off state, and a time duration during which the voice service and the data service are concurrent being greater than a second time threshold; or the 5G terminal being in a call and screen-on state but an application program that initiates the data service being running in background, and a time duration during which the voice service and the data service are concurrent being greater than a second time threshold.

In an embodiment of the present disclosure, the power consumption optimizing module is specifically configured to:

make the 5G terminal stop measuring a quality of a radio signal of an NR cell, and forcibly report a preset quality of the radio signal of the NR cell to a network side, where the preset quality of the radio signal of the NR cell is less than a quality threshold for NR cell deletion that is pre-configured by the network side, so that the network side is triggered to issue an NR cell deletion instruction to the 5G terminal after receiving the preset quality of the radio signal of the NR cell; and after receipt of the NR cell deletion instruction, delete the NR cell from a set of selectable cells for the 5G terminal, so that the data service is switched to the 4G LTE network.

In an embodiment of the present disclosure, after the data service is switched to the 4G LTE network, the power consumption optimizing module invokes the concurrency detecting module to continue to detect whether the 5G terminal is still in the state where the voice service and the data service are concurrent; and the apparatus further includes:

a power consumption optimization maintaining module, configured to make the 5G terminal continue to stop measuring the quality of the radio signal of the NR cell, when the 5G terminal is still in the state where the voice service and the data service are concurrent; and a network return triggering module, configured to make the 5G terminal resume normal measurement of the quality of the radio signal of the NR cell, and report a measurement result to the network side, when the 5G terminal is no longer in the state where the voice service and the data service are concurrent.

In an embodiment of the present disclosure, the power consumption optimizing module is specifically configured to:

forcibly report an SCG Failure signal to a network side, so that the 5G terminal stops detecting scheduling information of NR uplink and downlink shared traffic channels, and the network side is triggered, after receiving the SCG Failure signal, to stop issuing the scheduling information of the NR uplink and downlink shared traffic channels to the 5G terminal; meanwhile, make the 5G terminal stop measuring a quality of a radio signal of an NR cell, and delete the NR cell from a set of selectable cells for the 5G terminal.

In further another aspect, the embodiments of the present disclosure also provide an electronic device, which includes a memory, a processor, and a computer program stored on the memory and capable of running on the processor. When the processor executes the computer program, the aforementioned method for optimizing power consumption of a 5G terminal during concurrency of services are implemented.

In yet another aspect, the embodiments of the present disclosure also provides a non-transitory computer-readable storage medium having a computer program stored thereon. The computer program, when being executed by a processor, causes the aforementioned method for optimizing power consumption of a 5G terminal during concurrency of services to be implemented.

By adopting the above technical solutions, the present disclosure has beneficial effects, over the related art, as follows:

when a 5G terminal is located in an EN-DC network, in the present disclosure, it first detects whether the 5G terminal is in a state where a voice service and a data service are concurrent; when the 5G terminal is in the state where the voice service and the data service are concurrent, it further determines whether the 5G terminal meets a preset power consumption optimization condition; and if the 5G terminal meets the preset power consumption optimization condition, the data service is switched to a 4G LTE network. Since the power consumption of the 4G LTE network is much smaller than that of the 5G NR network, the switching of the data service to the 4G LTE network can significantly reduce the power consumption of the 5G terminal. In addition, under the scenario where the voice service and the data service are concurrent, a user mainly focuses on the voice service and has a decreased attention to the data service, therefore the switching of the data service to the 4G LTE network does not significantly affect the user experience.

Although the specific embodiments of the present disclosure have been described above, those skilled in the art should understand that these are only exemplary, and the scope of protection of the present disclosure is defined by the appended claims. Those skilled in the art can make many changes or modifications to these embodiments without departing from the principle and essence of the present disclosure, but these changes and modifications all fall within the scope of protection of the present disclosure.

What is claimed is:

1. A method for optimizing power consumption of a 5th Generation (5G) terminal during concurrency of services, wherein the 5G terminal is located in an Evolved Universal Terrestrial Radio Access-New Radio Dual Connectivity (EN-DC) network, and the method comprises:

detecting whether the 5G terminal is in a state where a voice service and a data service are concurrent;

determining whether the 5G terminal meets a preset power consumption optimization condition, in response to detecting that the 5G terminal is in the state where the voice service and the data service are concurrent; and switching the data service to a 4th Generation Long Term Evolution (4G LTE) network, in response to determining that the 5G terminal meets the preset power consumption optimization condition;

wherein the power consumption optimization condition comprises:

a time duration during which the voice service and the data service are concurrent being greater than a first time threshold; or the 5G terminal being in a call and screen-off state, and a time duration during which the voice service and the data service are concurrent being greater than a second time threshold; or the 5G terminal being in a call and screen-on state but an application program that initiates the data service being running in background, and a time duration during which the voice service and the data service are concurrent being greater than a second time threshold.

2. The method for optimizing power consumption according to claim 1, wherein the switching the data service to the 4G LTE network comprises:

making the 5G terminal stop measuring a quality of a radio signal of a New Radio (NR) cell, and forcibly report a preset quality of the radio signal of the NR cell to a network side, wherein the preset quality of the radio signal of the NR cell is less than a quality threshold for NR cell deletion that is pre-configured by the network side, so that the network side is triggered to issue an NR cell deletion instruction to the 5G terminal after receiving the preset quality of the radio signal of the NR cell; and after reception of the NR cell deletion instruction, deleting the NR cell from a set of selectable cells for the 5G terminal, so that the data service is switched to the 4G LTE network.

3. The method for optimizing power consumption according to claim 2, wherein after the switching the data service to the 4G LTE network, the method further comprises:

continuing to detect whether the 5G terminal is still in the state where the voice service and the data service are concurrent;

making the 5G terminal continue to stop measuring the quality of the radio signal of the NR cell, in response to detecting that the 5G terminal is still in the state where the voice service and the data service are concurrent; and making the 5G terminal resume measuring the quality of the radio signal of the NR cell and report a measurement result to the network side, in response to detecting that the 5G terminal is no longer in the state where the voice service and the data service are concurrent.

4. The method for optimizing power consumption according to claim 1, wherein the switching the data service to the 4G LTE network comprises:

forcibly reporting a secondary cell group (SCG) Failure signal to a network side, so that the 5G terminal stops detecting scheduling information of NR uplink and downlink shared traffic channels, and the network side is triggered, after receiving the SCG Failure signal, to stop issuing the scheduling information of the NR uplink and downlink shared traffic channels to the 5G terminal; meanwhile, making the 5G terminal stop measuring a quality of a radio signal of an NR cell, and delete the NR cell from a set of selectable cells for the 5G terminal.

5. An electronic device, comprising a memory, a processor, and a computer program stored on the memory and capable of running on the processor, wherein the computer program, when being executed by the processor, causes the processor to:

detect whether a 5th Generation (5G) terminal is in a state where a voice service and a data service are concurrent, wherein the 5G terminal is located in an Evolved Universal Terrestrial Radio Access-New Radio Dual Connectivity (EN-DC) network;

determine whether the 5G terminal meets a preset power consumption optimization condition, in response to detecting that the 5G terminal is in the state where the voice service and the data service are concurrent; and switch the data service to a 4th Generation Long Term Evolution (4G LTE) network, in response to determining that the 5G terminal meets the preset power consumption optimization condition;

wherein the power consumption optimization condition comprises:

a time duration during which the voice service and the data service are concurrent being greater than a first time threshold; or the 5G terminal being in a call and screen-off state, and a time duration during which the voice service and the data service are concurrent being greater than a second time threshold; or the 5G terminal being in a call and screen-on state but an application program that initiates the data service being running in background, and a time duration during which the voice service and the data service are concurrent being greater than a second time threshold.

6. The electronic device according to claim 5, wherein the computer program, when being executed by the processor, further causes the processor to:

make the 5G terminal stop measuring a quality of a radio signal of a New Radio (NR) cell, and forcibly report a preset quality of the radio signal of the NR cell to a network side, wherein the preset quality of the radio signal of the NR cell is less than a quality threshold for NR cell deletion that is pre-configured by the network side, so that the network side is triggered to issue an NR cell deletion instruction to the 5G terminal after receiving the preset quality of the radio signal of the NR cell; and after reception of the NR cell deletion instruction, delete the NR cell from a set of selectable cells for the 5G terminal, so that the data service is switched to the 4G LTE network.

7. The electronic device according to claim 6, wherein after the data service is switched to the 4G LTE network, the computer program, when being executed by the processor, further causes the processor to:

continue to detect whether the 5G terminal is still in the state where the voice service and the data service are concurrent;

make the 5G terminal continue to stop measuring the quality of the radio signal of the NR cell, in response to detecting that the 5G terminal is still in the state where the voice service and the data service are concurrent; and make the 5G terminal resume measuring the quality of the radio signal of the NR cell and report a measurement result to the network side, in response to detecting that the 5G terminal is no longer in the state where the voice service and the data service are concurrent.

8. The electronic device according to claim 5, wherein the computer program, when being executed by the processor, further causes the processor to:

forcibly report a secondary cell group (SCG) Failure signal to a network side, so that the 5G terminal stops detecting scheduling information of NR uplink and downlink shared traffic channels, and the network side is triggered, after receiving the SCG Failure signal, to stop issuing the scheduling information of the NR uplink and downlink shared traffic channels to the 5G terminal; meanwhile, make the 5G terminal stop measuring a quality of a radio signal of an NR cell, and delete the NR cell from a set of selectable cells for the 5G terminal.

9. A non-transitory computer-readable storage medium having a computer program stored thereon, wherein the computer program, when being executed by a processor, causes a method for optimizing power consumption of a 5th Generation (5G) terminal during concurrency of services to be implemented, the method comprising:

detecting whether the 5G terminal is in a state where a voice service and a data service are concurrent, wherein the 5G terminal is located in an Evolved Universal Terrestrial Radio Access-New Radio Dual Connectivity (EN-DC) network;

determining whether the 5G terminal meets a preset power consumption optimization condition, in response to detecting that the 5G terminal is in the state where the voice service and the data service are concurrent; and switching the data service to a 4th Generation Long Term Evolution (4G LTE) network, in response to determining that the 5G terminal meets the preset power consumption optimization condition;

wherein the power consumption optimization condition comprises:

a time duration during which the voice service and the data service are concurrent being greater than a first time threshold; or the 5G terminal being in a call and screen-off state, and a time duration during which the voice service and the data service are concurrent being greater than a second time threshold; or the 5G terminal being in a call and screen-on state but an application program that initiates the data service being running in background, and a time duration during which the voice service and the data service are concurrent being greater than a second time threshold.

10. The non-transitory computer-readable storage medium according to claim 9, wherein the switching the data service to the 4G LTE network comprises:

making the 5Gterminal stop measuring a quality of a radio signal of a New Radio (NR) cell, and forcibly report a preset quality of the radio signal of the NR cell to a network side, wherein the preset quality of the radio signal of the NR cell is less than a quality threshold for NR cell deletion that is pre-configured by the network side, so that the network side is triggered to issue an NR cell deletion instruction to the 5G terminal after receiving the preset quality of the radio signal of the NR cell; and after reception of the NR cell deletion instruction, deleting the NR cell from a set of selectable cells for the 5G terminal, so that the data service is switched to the 4G LTE network.

11. The non-transitory computer-readable storage medium according to claim 10, wherein after the switching the data service to the 4G LTE network, the method further comprises:

continuing to detect whether the 5G terminal is still in the state where the voice service and the data service are concurrent;

making the 5G terminal continue to stop measuring the quality of the radio signal of the NR cell, in response to detecting that the 5G terminal is still in the state where the voice service and the data service are concurrent; and making the 5G terminal resume measuring the quality of the radio signal of the NR cell and report a measurement result to the network side, in response to detecting that the 5G terminal is no longer in the state where the voice service and the data service are concurrent.

12. The non-transitory computer-readable storage medium according to claim 9, wherein the switching the data service to the 4G LTE network comprises:

forcibly reporting a secondary cell group (SCG) Failure signal to a network side, so that the 5G terminal stops detecting scheduling information of NR uplink and downlink shared traffic channels, and the network side is triggered, after receiving the SCG Failure signal, to stop issuing the scheduling information of the NR uplink and downlink shared traffic channels to the 5G terminal; meanwhile, making the 5G terminal stop measuring a quality of a radio signal of an NR cell, and delete the NR cell from a set of selectable cells for the 5G terminal.

* * * * *